US010643447B2

(12) United States Patent
Eberbach et al.

(10) Patent No.: US 10,643,447 B2
(45) Date of Patent: May 5, 2020

(54) PREDICTING HARMFUL CHEMICAL EXPOSURES AND IMPLEMENTING CORRECTIVE ACTIONS PRIOR TO OVEREXPOSURE

(71) Applicant: INTERNATIONAL BUSINESS MACHINES CORPORATION, Armonk, NY (US)

(72) Inventors: Adam H. E. Eberbach, Surrey Hills (AU); James R. Kozloski, New Fairfield, CT (US); Timothy M. Lynar, Kew (AU); John M. Wagner, Carlton (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 789 days.

(21) Appl. No.: 14/983,325

(22) Filed: Dec. 29, 2015

(65) Prior Publication Data
US 2017/0185905 A1    Jun. 29, 2017

(51) Int. Cl.
G06N 5/04 (2006.01)
G06N 7/00 (2006.01)
G06N 99/00 (2019.01)
G08B 21/12 (2006.01)

(52) U.S. Cl.
CPC .............. *G08B 21/12* (2013.01); *G06N 5/04* (2013.01)

(58) Field of Classification Search
CPC .................................. G08B 21/12; G06N 5/04
See application file for complete search history.

(56) References Cited

U.S. PATENT DOCUMENTS

| 7,321,121 | B2 | 1/2008 | Testardi |
| 7,716,147 | B2 | 5/2010 | Kelly et al. |
| 7,719,422 | B1 * | 5/2010 | Steinmetz et al. ..... G08B 13/14 |
| | | | 340/572.1 |
| 7,918,887 | B2 | 4/2011 | Roche |
| 7,983,426 | B2 | 7/2011 | Schuler et al. |
| 2004/0002160 | A1 | 1/2004 | Shih et al. |
| 2005/0244013 | A1 | 11/2005 | Battenberg et al. |

(Continued)

FOREIGN PATENT DOCUMENTS

EP    2270722    1/2011

OTHER PUBLICATIONS

Melamed, et al., "Adverse Work and Environmental Conditions Predict Occupational Injuries", American Journal of Epidemiology, Nov. 1997, pp. 18-26, vol. 150, No. 1.
Peter, et al., "A Wearable Multi-sensor System for Mobile Acquisition of Emotion-Related Physiological Data", Affective Computing and Intelligent Interaction, vol. 3784 of the series Lecture Notes in Computer Science, 2005, pp. 691-698.

(Continued)

*Primary Examiner* — Vincent Gonzales
*Assistant Examiner* — Scott R Gardner
(74) *Attorney, Agent, or Firm* — Tutunjian & Bitetto, P.C.; Anthony Curro

(57) ABSTRACT

A method of avoiding harmful chemical emission concentration levels, the method comprising implementing a cognitive suite of workplace hygiene and injury predictors (WHIP) that has learned to identify chemical emission sources and indicators of harmful chemical emission concentration levels, detecting an indicator, and implementing a corrective action by at least one of altering the operation of a chemical emissions source, modifying a time of a scheduled task, or changing prescribed personal protective equipment.

20 Claims, 7 Drawing Sheets

(56) References Cited

U.S. PATENT DOCUMENTS

| | | | |
|---|---|---|---|
| 2006/0085367 A1* | 4/2006 | Genovese | G06Q 10/00 706/44 |
| 2006/0259333 A1 | 11/2006 | Pyburn et al. | |
| 2009/0089108 A1* | 4/2009 | Angell et al. | G06Q 10/00 705/7 |
| 2009/0124870 A1 | 5/2009 | Arends et al. | |
| 2010/0119074 A1 | 5/2010 | Devinant | |
| 2011/0264008 A1 | 10/2011 | Yang et al. | |
| 2013/0217352 A1 | 8/2013 | Pan et al. | |
| 2013/0321637 A1* | 12/2013 | Frank et al. | H04N 5/33 348/152 |
| 2014/0031082 A1* | 1/2014 | Zishaan | G08B 21/12 455/556.1 |
| 2014/0156584 A1* | 6/2014 | Motokuri et al. | G06N 5/04 706/52 |
| 2016/0271800 A1* | 9/2016 | Stubbs et al. | B25J 9/1966 |
| 2017/0205512 A1* | 7/2017 | Asselot et al. | G01T 1/02 |

OTHER PUBLICATIONS

Picard, R., "Toward Machine Emotional Intelligence: Analysis of Affective Physiological State", IEEE Transactions on Pattern Analysis and Machine Intelligence, Oct. 2001, pp. 1175-1191, vol. 23, No. 10.

Picard, R., "Affective Wearables", ISWC '97 Proceedings of the 1st IEEE International Symposium on Wearable Computers, Oct. 1997, pp. 90-97.

Setz, et al., "Discriminating Stress From Cognitive Load Using a Wearable EDA Device", IEEE Transactions on Information Technology in Biomedicine, Mar. 2010, pp. 410-417, vol. 14, No. 2.

Steenland, et al., "Dying for Work: The Magnitude of US Mortality From Selected Causes of Death Associated With Occupation", American Journal of Industrial Medicine Jan. 2003, pp. 461-482.

Anonymous, "Predictive System to Reduce Exposure to Industrial Noise", ip.com, Jul. 2011, pp. 1-5.

National Safety Council, Research and Safety Management Group, "Injury Facts", 2013 Edition, 52 pages.

* cited by examiner

PREDICTING HARMFUL CHEMICAL EXPOSURES AND IMPLEMENTING CORRECTIVE ACTIONS PRIOR TO OVEREXPOSURE

BACKGROUND

Technical Field

The present invention relates to a system and method of environmental monitoring capable of detecting and more importantly predicting and preventing exposure to dangerous levels of chemicals, and more particularly to a cognitive system that learns and recognizes patterns and outcomes to predict a chemical exposure, and implements ameliorative actions chosen to reduce, remove, or eliminate exposure risks.

Description of the Related Art

Chemical exposures can induce many forms of damage to a person's health due to acute toxicity, including cancer, respiratory damage, heart damage, liver damage, kidney damage, mutagenic damage, and teratogenic harm. This level of exposure may be reached in typical industrial settings. Dangerous levels of chemical exposure may be generated by production methods, machinery and equipment, cleaning solvents, and chemical reactants in a variety of industries. In various environments, gaseous emissions may be particularly dangerous because they are typically unseen, may be undetectable by smell even at toxic levels, and may fill a large area rapidly. Gaseous emissions may include chemical compounds and hazardous air pollutants (HAP), which may include organic materials and heavy metals. In some cases the chemical compounds and hazardous air pollutants include materials that can build up to toxic levels in a person over time.

Workers may routinely be instructed to wear personal protective equipment that includes breathing apparatus, such as filters, masks, and respirators, but such routine instructions are typically not predictive and do not usually customize the level of protection for the actual worker and the actual environment. Workers may simply ignore such routine instructions, and even if followed may provide under or over protection. It would, therefore, be beneficial to provide a way of ameliorating such exposure risks.

SUMMARY

An aspect of the disclosure relates to a method of avoiding harmful chemical emission exposures, the method comprising implementing a cognitive suite of workplace hygiene and injury predictors (WHIP) that has learned to identify chemical emission sources and indicators of harmful chemical emission concentration levels, detecting an indicator, and implementing a corrective action by at least one of altering the operation of a chemical emissions source, modifying a time of a scheduled task, or changing prescribed personal protective equipment.

An aspect of the disclosure relates to a chemical emission protection system comprising cognitive suite of workplace hygiene and injury predictors (WHIP) that has learned to identify chemical emission sources and indicators of harmful chemical emission levels, a monitoring interface coupled to one or more sensor(s) for detecting an indicator, and a warning system configured to implement a corrective action by at least one of altering the operation of a chemical emission source, modifying a time of a scheduled task, and/or changing prescribed personal protective equipment.

An aspect of the disclosure relates to a non-transitory computer readable storage medium comprising a computer readable program for predicting exposure to harmful chemical emission levels, wherein the computer readable program when executed on a computer causes the computer to perform the steps of implementing a cognitive suite of workplace hygiene and injury predictors (WHIP) that has learned to identify chemical emission sources and indicators of harmful chemical emission levels, detecting an indicator, and implementing a corrective action by at least one of altering the operation of a chemical emission source, modifying a time of a scheduled task, or changing the prescribed personal protective equipment.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
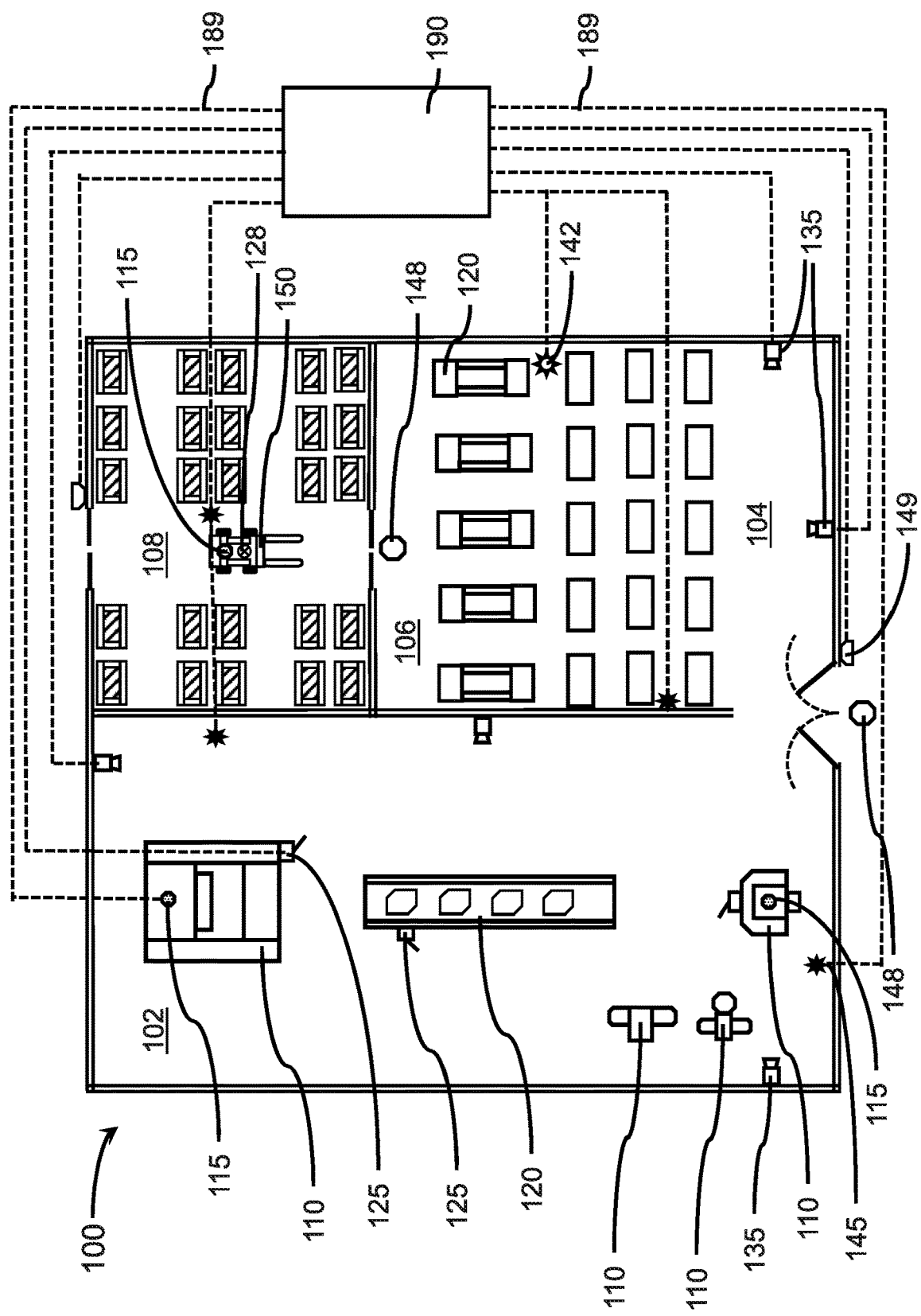
FIG. 1 is a plan view of a production facility having a chemical emission protection system in accordance with the present principles.

Often, people are exposed to chemical emission because they have not been forewarned that such exposures are likely to occur, for example, from equipment in a factory, a chemical production run, or a vehicle in an enclosed area. While the general environment may suggest chemical emission can occur, the actual occurrences may be intermittent and/or without sufficient warning, such that individuals are not outfitted with their personal protective equipment (PPE) or do not have sufficient notice to put on their PPE. A system that predicts the occurrence of chemical emission can address the hazards by providing sufficient time or changes to the environment to avoid such chemical emission events.

A worker may also travel between different workplace environments that pose different levels of chemical emission danger, for example, an office area may be relatively emission free compared to a production floor or warehouse where heavy equipment may be running and chemical are being used. A forklift idling in a warehouse may emit dangerous levels of carbon monoxide and/or carbon dioxide, which the forklift operator may be exposed to. A system that recognizes a worker's location and/or intended travel path in relation to chemical emission sources, and provides a reminder to don the PPE or shuts down equipment when the worker approaches a minimum safe distance, can provide sufficient time or changes to the environment for the worker to avoid such chemical emission events.

A reactive warning system can be inadequate in many instances because the harmful chemical emission event must have already occurred for it to be detected, and even if a warning is provided before an imminent actual event there may be insufficient time for people to protect themselves. Conversely, having people wear personal protective equipment constantly can introduce its own adverse effects including muffling sounds, obscuring vision, and carrying heavy breathing apparatus that can thereby create other dangerous situations.

In addition, there may be a constant level of chemical emissions generated by machinery and equipment used routinely for manufacturing, production, construction, and maintenance that contribute to the ambient chemical emission levels.

Principles and embodiments of the present disclosure relate to a system and method of identifying a state of an environment, and determining the likelihood of a chemical emission event based on one or more indicators representing the state of the environment.

Principles and embodiments also relate to a system and method including a cognitive suite of workplace hygiene and injury predictors (WHIP), also referred to as a "Cognitive WHIP," that measures accumulated industrial hygiene risks to individuals based on a measure of exposure to chemical emissions.

Principles and embodiments also relate to an approach to protecting persons from chemical emission exposures utilizing a cognitive WHIP system by learning one or more indicators of a detrimental chemical emission event and predicting an upcoming chemical emission event by detecting at least some of the one or more indicators.

Principles and embodiments also relate to anticipating the exposure of a person to a detrimental chemical emission event by recognizing existing indicators representing the state of an environment, and preemptively altering the person's exposure to the anticipated detrimental chemical emission level by changing the environment or changing the person's proximity to the chemical emission source.

Principles and embodiments also relate to predicting estimated chemical emission exposure levels of a person and tracking cumulative actual chemical emission exposure levels to pre-emptively adjusting the person's task schedule in anticipation of predicted chemical emission exposure.

A sequences of states or indicators that are predictive of industrial hygiene or injury events, where the injury may be acute toxicity or chemically induced damage, may be compiled as a cognitive suite of workplace hygiene and injury predictors (WHIP). The indicators may represent the state of an environment, for example safe verse unsafe, high risk verse low risk, active verse inactive, and/or avoidable verse unavoidable. The Cognitive WHIP system may learn, over one or more training sessions, which indicators predict safe verse unsafe, high risk verse low risk, active verse inactive, and/or avoidable verse unavoidable environments. The Cognitive WHIP system may then recognize an increased likelihood that a future change in environment may place a worker at risk for injury, where the injury can be acute toxicity or chemically induced damage. The Cognitive WHIP system may alert the worker of such increased risk, or take preventive steps to reduce or eliminate the potential risk.

In one or more embodiments, a cognitive WHIP system may learn a plurality of indicators that correlate with the probability that a detrimental chemical emission event or dangerous chemical emission level may occur in the immediate future, for example the electronic logging of a withdrawal of chemical reactants from storage can indicate a high probability that chemical emissions from a production run may occur. A chemical emission event may be a short term event (e.g., sudden opening of a reaction vessel) that can cause toxic chemical exposure within the short time period of exposure, whereas a chemical emission level may be a longer term chemical exposure that can cause toxicity if the exposure continues for an established period of time (e.g., carbon monoxide buildup from a running engine).

In various embodiments, the cognitive WHIP system may correlate a schedule of activities stored by the cognitive WHIP system with a plurality of indicators to associate the occurrence of a chemical emission event with a particular activity scheduled at the time of the occurrence in reference to a particular indicator. By recognizing that a particular indicator foretells the occurrence of a chemical emission event when a particular activity is scheduled, the cognitive WHIP system can learn to recognize which indicators, chemical emission events, and scheduled activities are interrelated, and predict what chemical emission levels are expected to occur in a chemical emission zone based on scheduled activities. The cognitive WHIP system may adjust scheduled activities to avoid or compensate for the chemical emission levels. The cognitive WHIP system may reduce a worker's exposure to chemical emission levels by changing the worker's schedule to minimize chemical emission exposures over a time period (e.g., work shift), which may include scheduling the worker to tasks in lower chemical emission zones and/or altering the time of assigned tasks to periods of lower chemical emission (e.g., night shift) when fewer machines or processes may be operating.

In various embodiments, one or more sensors may be suitably located to detect transitory signals (e.g., sounds, images, presence of equipment, presence of chemicals/compounds, presence of particular workers, etc.) in a prescribed environment, and to identify a sequences of states or indicators from the transitory signals. Sensors may include, but not be limited to, visual sensors (e.g., cameras), audio sensors (e.g., dosimeters, microphones), machine activation sensors (e.g., interlocks, control panels), vibration/motion sensors (e.g., accelerometers), chemical detectors (e.g., chemical sniffers or puffers), and/or location detectors (e.g., RFID, GPS, MLAT, etc.). The signals from the sensors may be received by the cognitive WHIP system and correlated with schedules tasks and activities by the cognitive WHIP system.

In an illustrative, non-limiting example, signals from a combination of cameras, interlocks, vibration sensors, motion sensors, chemical detectors, and location detectors, may be utilized in combination with a learned or predetermined sequences of states and a schedule to identify, for example, that a forklift is turned on, moving, and traveling along a prescribed path within a factory, or a pump has been activated to charge a reaction vessel with a combination of chemicals. Furthermore, the Cognitive WHIP system may know the intended path of the forklift through the facility, and pre-emptively shut down the forklift or equipment along the expected path of the forklift before the forklift operator comes within a minimum safe distance from the equipment at which he may be at risk. The range from the equipment may be predetermined based on the chemical emission generated by the equipment, ventilation in a chemical emission zone, a chemical detector measuring current chemical emission concentrations, and/or other environmental factors for example intervening walls. A person may be alerted to the expected occurrence of a harmful chemical emission level or chemical emission event through, for example, a mobile device (e.g., cell phone, pager) or PPE (e.g., walkie-talkie, headset, warning light) with sufficient time to implement the proper protective equipment, for example, putting on a face mask with a proper filter, or delay the assigned task until the harmful chemical emission level or chemical emission event has passed.

In various embodiments, a warning may be sent to the person to don suitable PPE before proceeding into a given work area/chemical emission zone, and/or a control signal may be transmitted to equipment to shut down before the person comes within a safe distance from the equipment. A control signal may be transmitted to a forklift to shut down before it comes within a distance from the equipment.

In one or more embodiments, the Cognitive WHIP system may maintain a cumulative record of the chemical emission exposure for one or more workers, and assess the likelihood that a worker will incur additional chemical emission exposures during an upcoming shift that exceeds a threshold that may place the worker at risk for toxicity or damage to their health.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, an exemplary embodiment of a manufacturing environment 100 implementing an exemplary cognitive WHIP system is shown in accordance with an exemplary embodiment.

A manufacturing environment 100 may include a plurality of sub environments, which can be identified as work areas and/or chemical emission zones. For example, a manufacturing environment may have work areas including a chemical processing or production floor 102 including heavy equipment and machinery for producing chemical compounds or parts for products, an assembly or compounding floor 104 where chemicals or parts from the manufacturing floor 102 are put together into a product, a packaging department 106 where the products are placed into suitable packaging and sealed, and a warehouse 108 where package products are stored for shipping and/or raw materials are received for the production floor. The manufacturing floor 102 may be separated from the assembly floor 104, packaging department 106, and warehouse 108, by various physical barriers including walls, doors, and air curtains. The manufacturing floor 102 may, therefore, constitute a separate chemical emission zone from the assembly floor 104, packaging department 106, and warehouse 108. The assembly floor 104 and packaging department 106, however, may constitute the same chemical emission zone, since there are no intervening barriers even though different types of work are being performed in the two areas. People in a chemical emission zone, therefore, may be exposed to chemical emission levels generated in more than one work area. Some facilities may have multiple work areas, but comprise only a single chemical emission zone.

Various machinery 110 and equipment 120 may be located throughout a manufacturing environment, where machinery and equipment may produce varying chemical emission levels. A large forklift, for example, may generate a higher chemical emission level during operation than a small generator or forklift even when idling. In addition, some equipment, for example a forklift 150, may be mobile and therefore generate transitory chemical emission as it passes other work stations. Furthermore, the chemical emission level (i.e., chemical concentrations) actually experienced or measured can depend on the distance from the source of the chemical emission. Diffusion and dispersal can reduce concentrations while stagnant or confined areas may allow quicker increases in concentration.

In one or more embodiments, sensors may be located at fixed positions within a work area, and/or associated with mobile equipment and workers, where the sensors are in communication with a chemical emissions protection system 190 over one or more communication path(s) 189. Communication path(s) 189 may be wired or wireless and implement hardware configured to provide wired and/or wireless communication path(s) 189, as would be known in the art.

In one or more embodiments, the sensors may include chemical detectors 145 that detect and measure chemical emission levels (i.e., chemical concentrations in parts-per-million (ppm), -billion (ppb), -trillion (ppt), etc.), which may include dosimeters that measure cumulative chemical emission exposures for a given period of time at different locations throughout a facility. The sensors may include microphones 142 that detect and measure noise levels (i.e., sound pressure levels), which may include dosimeters that measure cumulative noise-exposures for a given period of time at different locations throughout a facility. Sensors may include microphones of mobile devices worn (e.g., helmet mike, headset) or carried (e.g., cell phones) by workers that are wirelessly integrated with a chemical emissions protection system 190 implementing a cognitive WHIP system through wireless nodes positioned in a facility. Sensors may also include motion/vibration sensors 115 that can detect the movement of machinery 110 or equipment 120 during operation. Sensors may include interlock devices and controls 125 that are configured to detect when a machine is placed in an active state (i.e., turned on) and/or when the operator has logged into the machine or equipment, for example with a pass card, personal ID code, or personal key. Sensors may also include a portal 148 that determines when a worker or piece of equipment passes a specified point in the facility (e.g., an RFID Reader, image recognition, etc.).

In one or more embodiments, a chemical emissions protection system 190 implementing a cognitive WHIP system may include one or more servers, where the server(s) may be local to the manufacturing environment 100. In another embodiment, the chemical emissions protection system 190 may be in the cloud. In yet another embodiment, the chemical emissions protection system 190 may be both local and remote, such that the local components perform some of the functions implicated by the present principles, while the remote components perform other ones of the functions implicated by the present principles.

In one or more embodiments, the measured chemical emissions may be utilized to create a chemical emission map of chemical emissions zones by relating all of the chemical emissions measured at different locations at a given time. In various embodiments, a chemical emission map includes correlated chemical emissions data, spatial data, and time data, and may be stored as a multi-dimensional chemical emissions vector by the cognitive WHIP system. Historic chemical emissions data may, thereby, be stored as chemical emissions vectors and/or chemical emissions maps.

Maximum and minimum chemical emissions may be identified for a time period that may be predetermined (e.g., 10 min., 30 min., 1 hour, 4 hours, 8 hour shift, 1 day, 1 week, etc.), for example local minima may occur daily at 12:00 pm to 1:00 pm corresponding to a shut-down for lunch, 5:00 pm to 5:30 pm for a shift change, and a daily minima may occur from 1:00 am to 8:00 am when no shifts are running. Similarly, weekends may be identified as repeating weekly minima, and holidays may be identified as yearly minima. Conversely, daily maxima may be identified for 9:00 am to 11:00 am and 2:00 pm to 4:00 pm when all equipment is running. These times would depend on the work routine of the facility and the scheduled times for operations.

In various embodiments, a cognitive WHIP system may measure chemical emissions levels within one or more work areas using fixed chemical detectors 145 positioned around the work areas to measure chemical emissions over a period of time and store the chemical emission concentration values with the associated time that the measurement was taken. The period of time that measurements are taken and stored may be sufficiently long to identify all common chemical emissions generated in each work area. For example, a facility that runs only one daytime shift with a regular production schedule may require only a single day for the cognitive WHIP system to measure a full spectrum of chemical emissions produced in the work areas; whereas a job shop that has short production runs and operates different machinery and processes only intermittently may require a week or a month to measure a full spectrum of chemical emissions produced in the work areas. The cognitive WHIP system may measure and store time of day chemical emissions variations, time of week chemical emissions variations, time of month chemical emissions variations, etc., and correlate the chemical emission concentration variations with the scheduled activities occurring at the same time. The chemical emission concentration data and schedule data may be stored in the system's non-transitory memory and made available and accessible through the cognitive WHIP system.

In one or more embodiments, the cognitive WHIP system may be trained by purposely producing a full spectrum of chemical emissions produced in the work areas in a predefined period, and correlating the chemical emissions with known indicators and operations. By associating the measured chemical emission concentrations at known locations in work areas and determining which locations detect and measure chemical emissions generated by machines and equipment in different work areas, the cognitive WHIP system can learn and create a chemical emissions map and identify chemical emissions zones. A series of chemical emission maps may be generated for multiple sub-time periods (e.g., 5 min., 15 minute intervals) in a predetermined time period (e.g., 1 hour, 8 hour production shift, 24 hour day, etc.) to identify variations in chemical emissions levels at the different locations.

In one or more embodiments, the cognitive WHIP system may identify and designate appropriate respiratory protection for workers assigned to specific work areas at specific times in response to predicted chemical emissions based on the chemical emission maps. The cognitive WHIP system may calculate expected chemical emission exposures for a worker and recommend respiratory protection that is not over-protective or under-protective (i.e., having the proper filtering functionality, NIOSH rating, full facemask, SCBA, etc.) for the predicted chemical emissions exposures. The breathing protection may, thereby, be customized for a time period, sub-time period, or assigned task based on the chemical emission maps and expected length of exposure to the chemical emission concentrations, which may be based on a worker's schedule, assigned tasks, and/or transit path.

In various embodiments, the cognitive WHIP system may use the chemical detectors to detect and measure actual chemical emission concentrations occurring in one or more chemical emission zones to confirm that actual chemical emission levels correspond with predicted chemical emission levels. If actual chemical emission levels are different from the predicted chemical emission levels based on the chemical emission maps, the cognitive WHIP system may provide warnings and/or dynamically update the chemical emission maps through a monitoring and/or learning function. In various embodiments, warnings may be visual, audible, tactile (e.g., vibrations), or a combination thereof, to alert one or more workers of changes in instantaneous chemical emission concentrations values and/or a cumulative chemical emission concentration-time values in a chemical emission zone.

In one or more embodiments, the sensors may include cameras 135 located at fixed positions that detect and record images (i.e., still images and video) at different locations throughout a facility. The cameras may be located at a fixed position within a work area, or may be a mobile device (or part of a mobile device) located on a worker or equipment (e.g., forklift). The images may be analyzed to identify workers, equipment, and various visual indicators picked up by a camera 135, for example by image recognition. The camera may also provide visual indications of the activities occurring within a work area. The camera(s) 135 may be utilized to identify the presence of workers in a particular area, additional equipment (e.g., forklift) in a particular area, operation of particular machinery, type of product/parts being produced, and/or identify activities occurring in a particular location (e.g., retooling machine, maintenance, stocking raw materials for production run, charging tanks/bins/hoppers/in-feeds, installing/removing/transporting equipment to different location in plant/factory, etc.). In various embodiments, microphones 142 may or may not be associated with a particular camera 135.

In one or more embodiments, the sensors may be microphones 142 located at fixed positions or as a mobile device with a person or on equipment (e.g., forklift 150). The microphone(s) may be utilized to identify the presence of workers in a particular area, additional equipment (e.g., forklift) in a particular area, operation of particular machinery, type of product/parts being produced, and/or identify activities occurring in a particular location (e.g., retooling machine, maintenance, stocking raw materials for production run, charging tanks/bins/hoppers/in-feeds, installing/removing/transporting equipment to different location in plant/factory, etc.) by sound recognition.

In one or more embodiments, the sensors may include interlocks 125 located on machinery, equipment, and at access points. The interlocks 125 may require a worker to enter a personal passcode, use a magnetic or optical pass card, or a biometric sensor to activate the machine, equipment, or for entry. The cognitive system may identify the specific worker at the location of the interlock 125, and correlate the presence of the worker with a scheduled task to recognize the correlated occurrences as an indicator that a particular operation is imminent. In contrast, the cognitive system may identify the absence of the specific worker at a location for a scheduled task, and recognize the correlated occurrences as an indicator that a particular operation is not imminent.

In one or more embodiments, the sensors may also be a switch, and/or current meter or volt meter, which may be part of an interlock, that detects when a particular piece of machinery or equipment is turned on, and therefore generating emissions. In various embodiments, an interlock or switch (e.g., a PLC, relay, etc.) may be configured to receive signals and/or instructions from a monitoring interface, warning system, calendar generator, and/or scheduler to slow down or turn off the particular piece of machinery or equipment.

In one or more embodiments, the sensors may include vibration and/or motion sensors 115 that can detect the operation of equipment or machinery left in an active state independent of the presence of a worker or other indicators.

In one or more embodiments, the sensors may also be a logging device or access interface 149 that requires a worker to provide his or her identify before entering a work area or accessing a piece of equipment or machinery. In various embodiments, ingress and egress by workers to a work area may be controlled by access points (i.e., doors, gates, elevators) that require a worker to enter an identification code, swipe a magnetic pass key or badge, or use a biometric to identify the worker entering an area and prevent access to others. In various embodiments, the presence of a worker scheduled to operate a piece of equipment or machine at a particular time may be used as an indication that the piece of equipment or machine will be operating at the scheduled time. The presence of a worker as indicated by the sensor may be utilized to confirm that the worker will be experiencing a level of chemical emission exposure. The actual chemical emission exposure for the worker may then be monitored by a monitoring interface 340, where the monitoring interface may be coupled to and receive signals from one or more sensor(s).

In one or more embodiments, the sensors may include location detectors 128 (e.g., RFID, GPS, MLAT, etc.) that may be worn by workers and/or attached to mobile equipment, for example a forklift 150, which can identify the location of the workers and equipment. A sensor may be a RFID chip or GPS device that identifies and/or tracks the location of a worker in a work area/chemical emission zone. The RFID chip and/or GPS device may be utilized to identify the location of a worker during a scheduled work period, and/or the path that a worker takes between different locations, for example, from an ingress point where a portal 148 reads the worker's RFID or the worker logged in to an operator station for an assigned task. The path may be learned by the system and used to estimate chemical emission exposures for future work periods.

Figure 2:
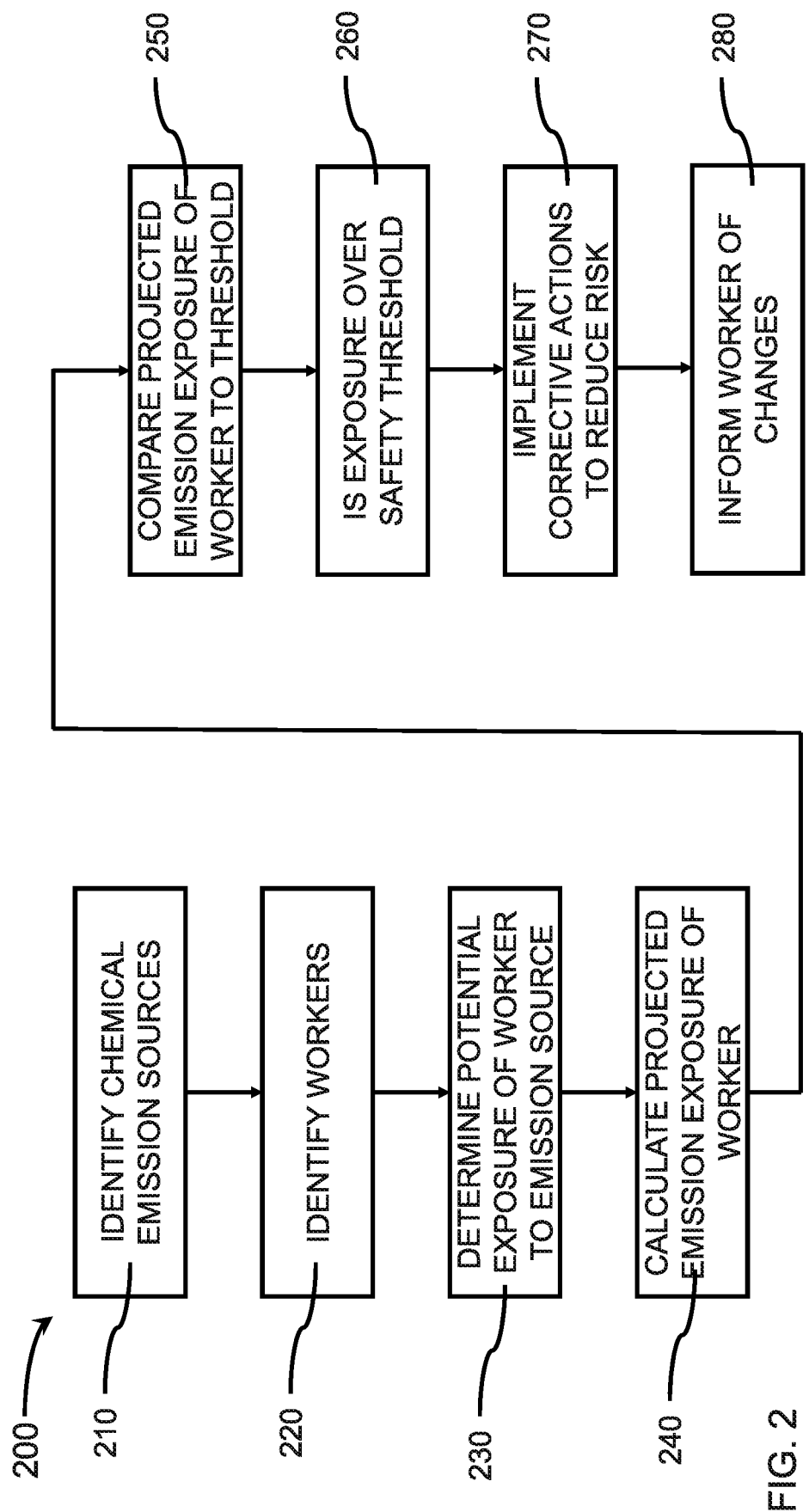
FIG. 2 is a block/flow diagram of a method of predicting chemical emission exposures according to an exemplary embodiment.

FIG. 2 is a block/flow diagram of a method 200 of predicting chemical emission exposures according to an exemplary embodiment.

In block 210, a chemical emission protection system may receive signals relating to chemical emissions generated in a work area and identify the chemical emissions as associated with a specific machine or piece of equipment operating in the work area. The chemical emissions protection system may include a cognitive WHIP function that has learned to identify a specific type of chemical emissions corresponding to a specific type of machine or operation, or has been configured to learn that a specific type of chemical emissions is associated with a specific type of machine or operation. A forklift or generator, for example, may generate carbon monoxide and carbon dioxide, whereas use of a cryogenic Dewar (i.e., vacuum bottle) filled with liquid nitrogen can generate nitrogen gas, and dry ice used for industrial or process cooling generates gaseous carbon dioxide. Similarly, an incinerator, for example, may generate heavy metal pollutants (e.g., mercury, chromium, lead, arsenic, etc.) when processing particular materials, and hydrogen sulfide ($H_2S$) or nitrogen dioxide ($NO_2$) when operating under other conditions.

In one or more embodiments, a list of machinery and/or equipment may be stored in a non-transitory memory of a chemical emission protection system as one or more objects (e.g., files) relating to types of chemical emissions generated by the machinery and/or equipment, and may be associated with the particular machinery and/or equipment, for example, in a suitable data structure. A chemical detector 145 may detect the chemical emissions generated by the machinery and/or equipment, and the chemical emission protection system may receive and store the chemical emission concentrations as an object in the non-transitory memory.

In block 220, a chemical emissions protection system may identify a worker as present in a work area.

In one or more embodiments, a list of workers may be stored in a non-transitory memory of a chemical emissions protection system 190 and data relating to the total chemical emissions exposure may be associated with each worker, for example, in a suitable data structure. The chemical emissions protection system 190 may be configured to access the list of workers and produce an assignment schedule for each worker.

In one or more embodiments, a worker may be identified by logging in a personal identification code (PID) and/or a pass card used to access a work area, a RFID that is detected by a portal (e.g., RFID reader) at ingresses to/egresses from a work area, a GPS associated with the worker, and/or cameras and facial recognition software focused on the work area, where identification of a worker may be by facial recognition.

In block 230, a chemical emissions protection system may determine the potential exposure of an identified worker by analyzing the identified worker's assignment schedule, identifying one or more assigned tasks for the worker, determining the work location(s) and/or operator station(s) at which the worker will be positioned in a work area for the assigned tasks, identifying the path used by the work to transit to the work location(s) and/or operator station(s), analyzing a chemical emissions map for the work area, and calculating a predicted amount of cumulative chemical emissions exposure for the worker.

In one or more embodiments, the chemical emissions protection system 190 may calculate a cumulative chemical emissions exposure for a worker for a scheduled time period before the worker arrives in the work area. The scheduler may adjust the assigned tasks for the worker to work location(s) and/or operator station(s) having lower chemical emissions to reduce the predicted amount of cumulative chemical emissions exposure for the worker if the stored total chemical emissions exposure associated with the worker is above a predetermined amount. The worker may be alerted to a schedule change before the worker arrives in the work area.

In block 240, the chemical emissions protection system may monitor the chemical emissions and chemical concentrations present in a chemical emissions zone, the location of one or more workers in the chemical emissions zone, a path taken by the workers through the chemical emissions zone, changes in the state of machinery and equipment (i.e., chemical emission sources) in the chemical emissions zone, identify chemical emission sources contributing to the expected chemical emissions level in a chemical emissions zone, and calculate a cumulative predicted chemical emissions exposure for the workers.

Historic chemical emissions data may be used to calculate a predicted chemical emissions exposure for one or more workers, or actual chemical emission concentrations detected and measured at one or more sensors may be used with a worker's actual location, task assignment, and expect path to calculate a predicted chemical emissions exposure for the one or more workers.

In block 250, the chemical emissions protection system may compare the predicted chemical emissions exposure of the worker to a safety threshold value, where the threshold value may be an instantaneous chemical concentration value and/or a cumulative chemical concentration-time value. An instantaneous chemical concentration threshold value may be based on the known or predetermined toxicity of the chemical compound. A cumulative chemical concentration-time threshold value may be based on known or predetermined accumulation rates in a person at known concentration levels, where the cumulative chemical concentration-time threshold values may be permissible exposure times for continuous time weighted average chemical concentration levels. The cognitive WHIP system may be configured to monitor the amount of time that a worker is exposed to a measured chemical concentration to calculate a cumulative chemical concentration-time value, and record the amount of exposure time, chemical emissions exposure levels, and cumulative chemical concentration-time value, which may be associated with each worker and stored in a non-transitory memory.

In block 260, the chemical emissions protection system may determine whether the chemical emissions exposure is above a predetermined safety threshold value. If the worker's predicted or actual exposure is determined to be over the safety threshold value, the chemical emissions protection system may signal that adjustments may be required to the chemical emissions zone and/or worker schedule.

In block 270, the chemical emissions protection system 190 may implement corrective actions to reduce risk, which may include reducing the chemical emission levels or modifying the worker's task schedule. The chemical emissions protection system 190 may transmit a control signal to machinery and/or equipment to slow down or turn off for a predetermined period of time to reduce the chemical emission levels in the particular chemical emissions zone, signal the worker to take an alternate transit path to a location in the facility, alter the workers scheduled tasks to avoid the chemical emissions in the particular emission zone, or a combination thereof. The chemical emissions protection system 190 may also change the prescribed PPE for the worker to alter the type of respiratory protection, or allocate additional respiratory protection to the worker.

In block 280, warnings may be transmitted to the worker in real time to alert the worker of the danger, a change in schedule, a change in transit path, or a change in protective equipment, which may be received by the worker on a mobile device or PPE. A worker may be informed of actual dangerous concentration levels in particular chemical emissions zone(s) before the worker enters the particular zone(s).

Figure 3:
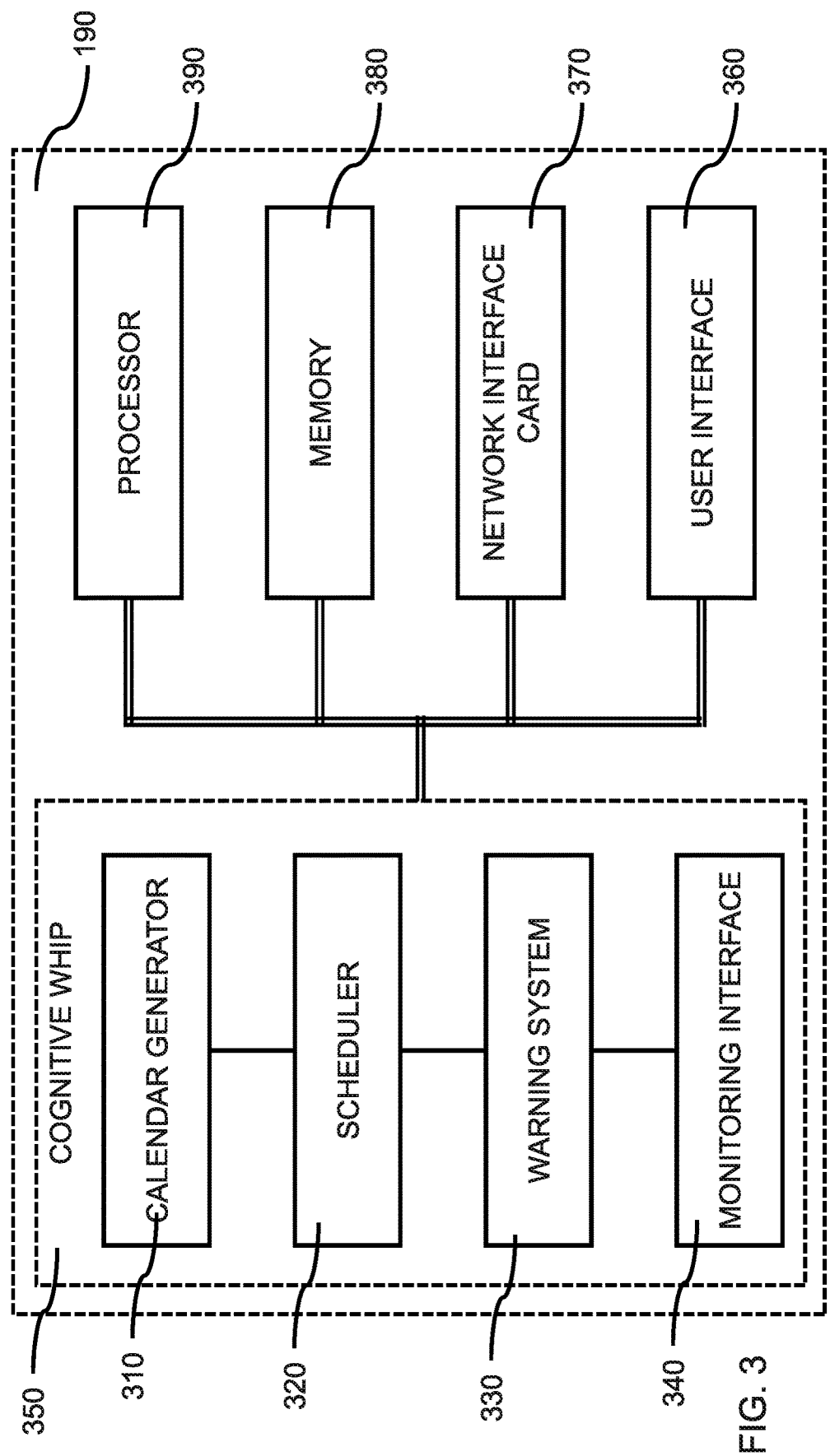
FIG. 3 is a block diagram of a chemical emission protection system according to an exemplary embodiment.

FIG. 3 is a block diagram of a chemical emission protection system according to an exemplary embodiment.

In one or more embodiments, a chemical emissions protection system 190 includes hardware configured to implement one or more systems for scheduling and monitoring worker chemical emissions exposure. The chemical emissions protection system 190 may include a processor 390 for executing computer code configured to identify worker assignment patterns, identify chemical emissions sources contributing to total worker chemical emissions exposure, calculate cumulative chemical emissions exposure for one or more workers based on scheduled interactions with identified chemical emissions sources, and adjust worker and production scheduling to maintain cumulative chemical emissions exposure for a worker below a threshold amount. The chemical emissions protection system 190 may include non-transitory memory 380 for storing code and data, a network interface card 370 for communicating with external systems, and a user interface 360 that may include a display, a graphical user interface (GUI), and various I/O devices. An embodiment of a chemical emissions protection system 190 may include a calendar generator 310, a scheduler 320, a warning system 330, a monitoring interface 340, and a cognitive WHIP 350 for learning and prediction utilizing data and functions of the calendar generator 310, scheduler 320, warning system 330, and monitoring interface 340, which may be implemented as software or implemented in part in software, where such software may be stored in a non-transitory memory. A chemical emissions protection system 190, which may include a calendar generator 310, a scheduler 320, a warning system 330, a monitoring interface 340, and a cognitive WHIP 350 may also be implemented as least in part in hardware, including standalone devices, boards, integrated circuits, where at least one may be implemented as application specific integrated circuits (ASICS). While particular components and functions may be attributed to a particular system or module, this is for descriptive purposes only. Various components and functions may be swapped between the systems and modules or distributed and rearranged amongst different systems and modules, where such arrangements are contemplated to be within the scope of the invention as set forth in the claims.

Figure 4:
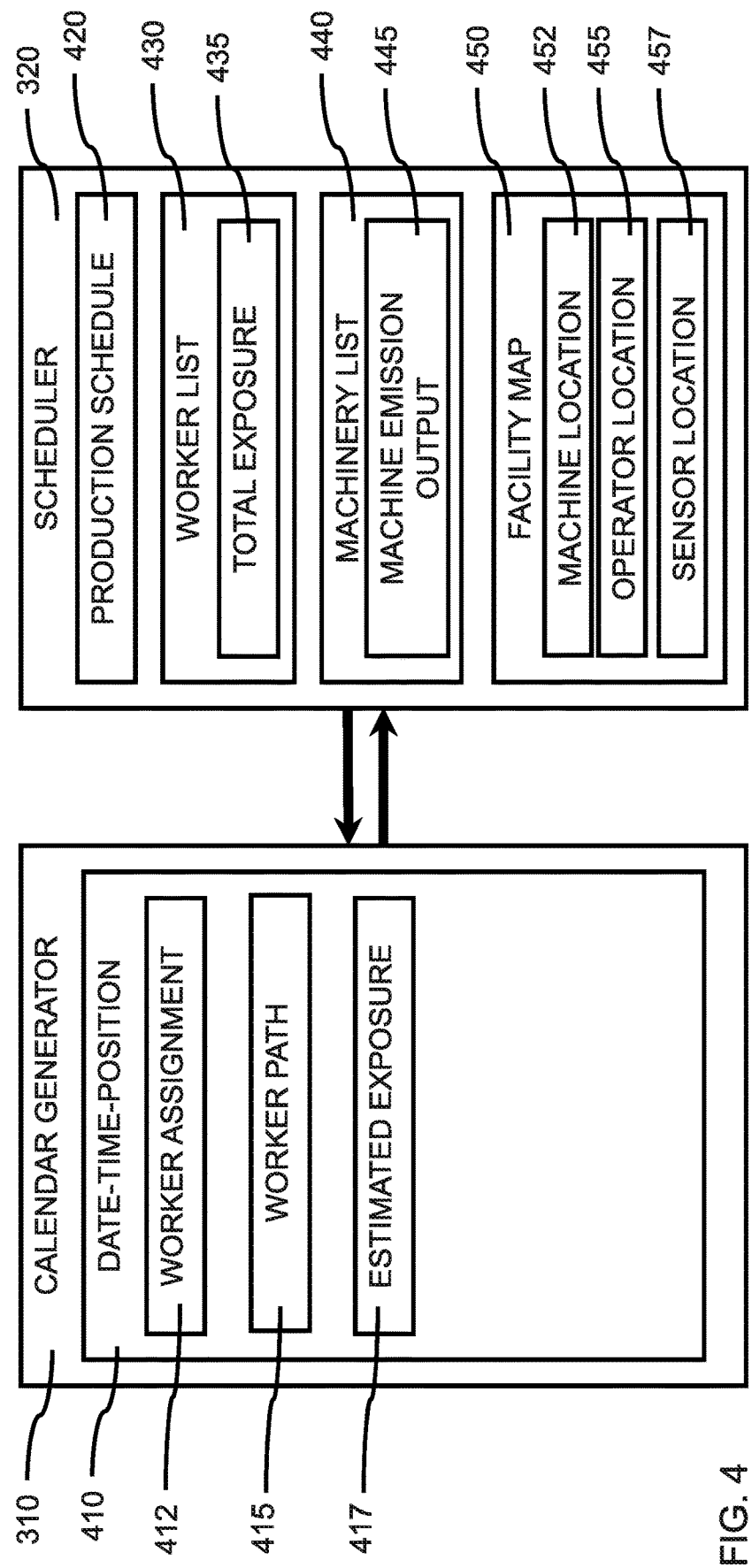
FIG. 4 is a block diagram of a calendar generator and scheduler according to an exemplary embodiment.

FIG. 4 is a block diagram of a calendar generator and scheduler according to an exemplary embodiment.

In one or more embodiments, a calendar generator 310 may be configured to keep track of the date and time 410 of worker assignments 412, and track worker patterns to determine an estimated chemical emissions exposure for each of one or more workers. The calendar generator 310 may record date, time, and position data 410 of worker assignments 412, the worker transit paths 415, and a value for the total predicted/estimated chemical emissions exposure 417. It should be noted that the term "worker" is intended to broadly encompass all persons in a work environment including, but not limited to, hourly and salaried employees of a business, daily contract worker, outside contractors, visiting members of other businesses, and other persons that may be located in the vicinity of a potential chemical emissions source at a known time. A worker may not be someone outside the knowledge and/or control of a business.

In one or more embodiments, a scheduler 320 may be configured to keep track of intended production output, production deadlines, man-hours required to complete the intended production output by the production deadline(s), a list of workers available to staff the production jobs to meet the required man-hours for production, a value for the cumulative actual chemical emissions exposure associated with each worker, a list of machinery and equipment available for production, and chemical emission output levels associated with each of the production operations, machines, and equipment. The scheduler 320 may also be configured to assign work tasks to one or more workers, where an estimated chemical emissions exposure is calculated for each task assigned during a work period. The tasks assigned to a plurality of workers may be adjusted to balance the cumulative chemical emissions exposure for each worker of a predetermined time period, for example, workers may be rotated between shifts in high and low chemical emissions zones on a daily (i.e., morning-afternoon-night shifts) basis, a weekly basis, a monthly basis, etc., where the worker is assigned to a different chemical emissions zone each day. The scheduler 320 may also access available data on the transit path that each worker takes between work locations.

In one or more embodiments, the scheduler 320 may create and record a production schedule 420, a worker list 430, which includes the value for the cumulative actual chemical emissions exposure 435 associated with each worker, a machinery and equipment list 440, which includes value(s) for the actual chemical emissions output (i.e., chemical concentrations, output rate) 445 associated with each production operation, machine, or piece of equipment, and a facility map 450, which includes the locations 452 of each production operation, machine, and piece of equipment, the location of the operator station 455 associated with each machine and/or piece of equipment, and the location of each sensor 457.

A scheduler 320 may be configured to iteratively prepare a tentative assignment schedule for a worker, calculate a predicted chemical emissions exposure for the worker for the scheduled time period, add the calculated predicted chemical emissions exposure to the cumulative actual chemical emissions exposure associated with worker to obtain a total predicted worker chemical emissions exposure, compare the total predicted chemical emissions exposure to a threshold chemical emissions exposure, and prepare a different tentative assignment schedule and calculate a new predicted chemical emissions exposure for the worker if the total predicted worker chemical emissions exposure is above the threshold chemical emissions exposure. The iterative calculations and schedule preparation may be performed by a processor. The value for the total predicted/estimated chemical emissions exposure may be provided to and stored 417 by a calendar generator 310 in non-transitory memory.

A scheduler 320 may be configured to identify predicted low chemical emissions periods, and schedule particular tasks during the low chemical emissions periods. Tasks scheduled during predicted low chemical emissions periods may include machine maintenance, training sessions, cleaning and janitorial work, and other tasks more susceptible to gaseous chemical emissions (e.g., heavy exertion). The scheduler may be configured to examine daily, weekly, and/or monthly variations in actual chemical emissions levels correlated with scheduled operations to identify low chemical emissions periods, and predict time variations based on changes in scheduled operations to identify variations in the timing of low chemical emissions periods.

While a time period may be predicted to be a low chemical emissions period based on historic data and examined variations, actual chemical emissions levels may be markedly higher than the predicted chemical emissions levels due to unexpected emergencies (e.g., delayed material deliveries, fire, weather or natural disasters), changes in production output (e.g., machine breakdown) and shortened production deadlines (e.g., running faster, a third shift). A monitoring system may detect actual chemical emission levels through sensors, and update the system to adjust the calculated chemical emissions exposure of the workers, and/or update the chemical emission maps to reflect that the predicted low chemical emissions period is not actually a low chemical emissions period.

Figure 5:
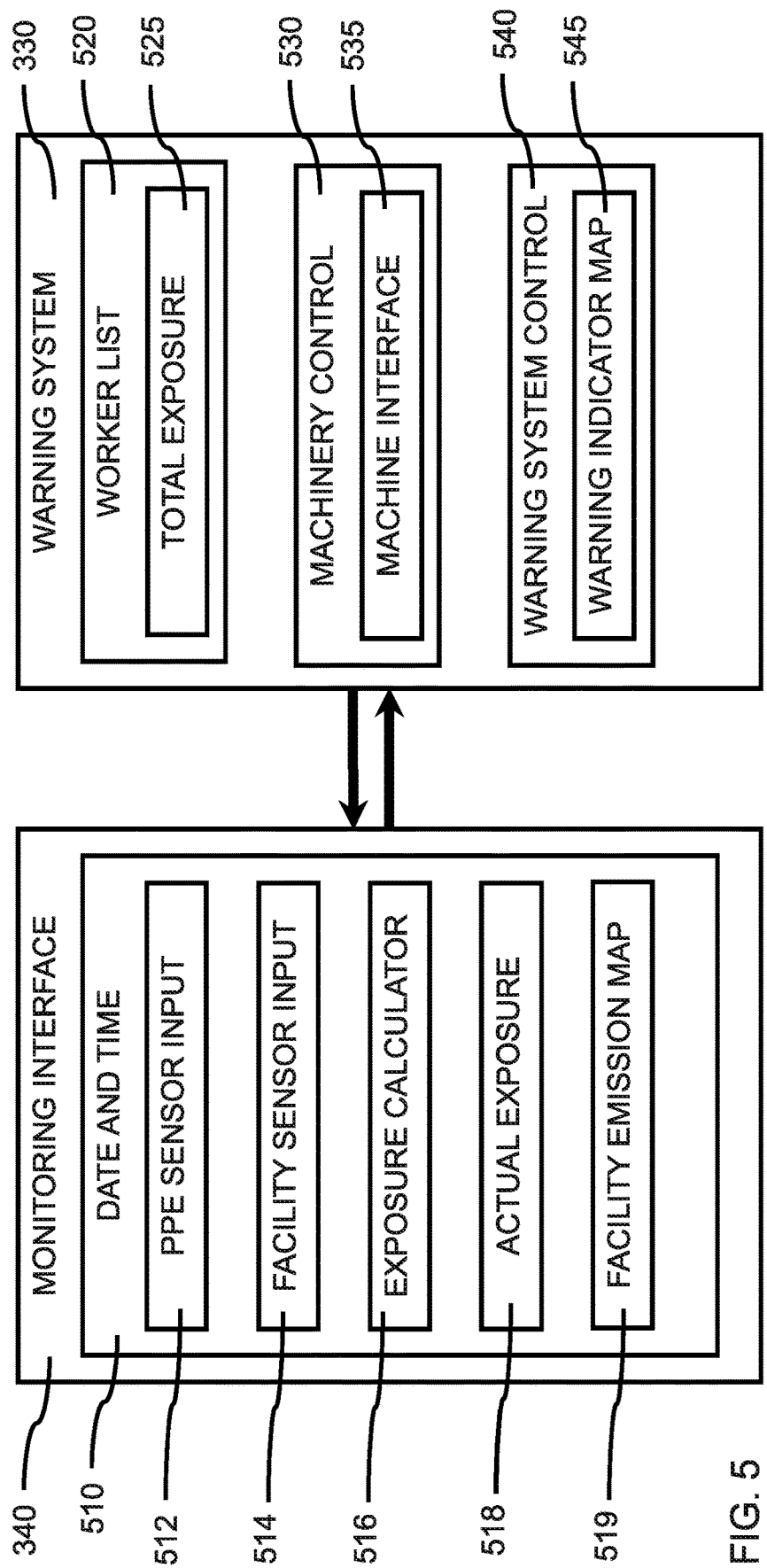
FIG. 5 is a block diagram of a monitoring interface and warning system according to an exemplary embodiment.

FIG. 5 is a block diagram of a monitoring interface and warning system according to an exemplary embodiment.

A monitoring interface 340 may be configured to perform chemical emissions level monitoring utilizing a processor by receiving signals from one or more sensors, where the signals represent chemical concentrations, audio and video indications of activity and/or production levels within one or more chemical emissions zone(s), as well as electronic signal(s) indicating the state of machinery and equipment, and the presence of workers. A monitoring interface 340 may be configured to identify when a piece of machinery or equipment is in an operating state, and therefore, generating chemical emissions at an expected concentration. A monitoring interface 340 may also be configured to store and update a chemical emissions map to identify chemical emissions zones and chemical emission concentration levels, where the chemical emissions map may be time dependent and based on equipment and machinery operations.

The monitoring interface 340 may receive and store date and time data 510 associated with PPE sensor signal data 512 (i.e., chemical concentrations) received from mobile chemical sensors (e.g., sensor badges, portable sniffer) associated one or more workers, and facility sensor signal data 514 (i.e., chemical concentrations) received from fixed sensors, for example chemical detector(s) 145, at specific locations within a facility. The monitoring interface 340 may include an exposure calculator 516 that integrates the received chemical emission concentration data over the time period that the data is received to determine a cumulative actual chemical emissions exposure for each worker, and stores the received data and calculated cumulative actual chemical emissions exposure 518 in a non-transitory memory.

In one or more embodiments, a monitoring interface 340 of the chemical emissions protection system 190 may monitor the actual chemical emission concentrations experienced by the one or more workers in a chemical emissions zone, and compare the actual chemical emissions concentrations experienced to the predicted chemical emissions exposure, which may have been calculated by a scheduler 320. A worker's location and transit path may be monitored to determine the chemical emissions zone occupied by the worker when exposed to a detected chemical emission, and compare the actual chemical emission exposure to the predicted chemical emissions exposure.

In one or more embodiments, the monitoring interface 340 may communicate a difference in the actual and predicted chemical emissions to the scheduler 320, and corrections to the worker's schedule may be made to compensate for actual chemical emissions exposures over or under predicted chemical emissions exposure. The schedule changes may be communicated to the worker through a mobile device (e.g., cell phone, pager, laptop, tablet, etc.) or PPE (e.g., walkie-talkie, headset, etc.). A control signal may be communicated over a communication path to machinery and/or equipment in the chemical emissions zone occupied by the worker, where the control signal causes the machinery and/or equipment to temporarily slow or shut down to protect the worker.

The monitoring interface 340 may also be configured to create and store facility chemical emissions maps 519, and update chemical emissions maps based on the actual chemical emissions data received from the sensors. The chemical emissions maps 519 may be used by the scheduler 320 to calculate a predicted chemical emissions exposure for the worker for the scheduled time period when preparing a tentative assignment schedule for a worker.

A sensor may be a chemical detector 145 that measures chemical concentrations at a location in the chemical emissions zone. The chemical detector may be located at a fixed position within a work area, or may be a mobile device (or part of a mobile device) located on a worker, which may be part of the worker's personal protective equipment (PPE).

In one or more embodiments, the warning system 330 may store a worker list 520, which includes the value for the cumulative actual chemical emissions exposure 525 associated with each worker, a machinery controller 530, which may be coupled to one or more pieces of machinery or equipment, and may be configured to send and/or receive control signals to each machine or piece of equipment through a machine interface 535, and includes hardware for communicating with the machinery and equipment over a communication path 189. The warning system 330 may be configured to receive an indication from a monitoring interface 340 that chemical emission levels in a chemical emission zone are higher than predicted. The a machinery controller 530 may be configured to send a shut-down signal to a machine or piece of equipment in a chemical emission zone determined to have chemical emission levels higher than predicted to thereby reduce chemical emissions in the zone.

In various embodiments, the warning system 330 may include a warning system control 540 that is connected to and in communication with one or more warning indicators, which may be visual, audible, and/or tactile, and a map 545 of the locations of the warning indicators for a facility. The warning indicator map 545 may store the location of each warning indicator and or communication addresses for mobile devices and PPE for workers, such that warning may be sent to a specific worker or an indicator in a chemical emission zone may be activated. The warning system 330 may be configured to receive an indication from a monitoring interface 340 that a worker has a cumulative actual chemical emissions exposure 525 approaching or above a threshold limit, which may be determined by an exposure calculator 516, and transmit a warning to that worker utilizing communication hardware (e.g., network interface card, wireless nodes, etc.). A warning may include instructions to put on particular PPE, to leave a chemical emission zone, or to take an alternate path to a work location or operator's station.

In various embodiments, a calendar generator 310, scheduler 320, warning system 330, and monitoring interface 340 may be part of a learning module 350 (i.e., cognitive WHIP) that develops recognition of behavioral patterns and adjusts worker scheduling based on previously recognized patterns and outcomes to pre-emptively adjust production and/or worker scheduling, worker task assignment, worker personal protective equipment allocation, and/or worker transit paths. The cognitive WHIP 350 may analyze inputs and/or stored data and information for one or more systems or modules to develop models that predict chemical emission exposure levels for a period of time, for example, a worker's shift, and apply the model to calculate the probability of toxicity or health damage to a worker for the predicted chemical emission exposure levels. A chemical emission exposure level may include the chemical concentrations at a distance from all contributing chemical emission sources for all expected positions of a worker during the specified time period, including transitory positions as a worker moves from one location to another within a chemical emissions zone.

A plurality of equipment and machines may contribute to increased chemical emissions concentrations within a bounded area, which is referred to as the chemical emissions zone. The chemical emissions zone may be bounded by physical barriers, such as walls, doors, ceilings, floors, and other intervening objects (e.g., pallets, racks, tanks, hoppers, silos, bins, bags, rolls, etc., of raw or finished materials) that reduce ventilation and dispersal of chemical emissions from equipment and machines inside the identified chemical emissions zone. A monitoring threshold may be predetermined from prior experience, determined by governmental or industry standards (e.g., OSHA), known toxicity or danger levels, or a combination thereof.

In one or more embodiments, the combination of adjusting a worker's schedule and assignments, controlling machine and equipment operation times, altering worker's PPE, and allocating suitable respiratory protection can reduce exposure to industrial chemical emissions by the worker.

In a non-limiting example, a specific worker may be assigned to operate a piece of equipment that has been determined to generate a known chemical emission at the operator's station, in addition, prior analysis of operator behavior has determined that an operator moves closer to the equipment an average number of times per time period to perform other intermittent operations resulting in an increased chemical emissions exposure for short durations, other machines and equipment within the identified chemical emissions zone have been identified as contributing to the chemical emissions at the worker' location, as measured using fixed and/or mobile sensors. The worker is known to move from an entrance to the identified chemical emissions zone to the operator's station along a known and recognized path (e.g., the worker's habitual or predefined path though the work area), which includes exposure to varying chemical emissions generated by other machines and equipment within the identified chemical emissions zone along the worker's path.

In one or more embodiments, a warning system 330 may be configured to present information to one or more workers that an unacceptable chemical emission concentration level exists in a chemical emissions zone, where the worker may be informed about the zones via augmented reality.

In various embodiments, the chemical emissions protection system 190 accepts all of the data and inputs, and calculates the worker's total predicted exposure for an entire time period (e.g., shift). The worker's schedule and/or assignments may be altered to avoid and/or reduce particular identified exposures, and the equipment and machinery production may be interrupted to lower the chemical emissions along the worker's path or at the operator station to reduce the total actual chemical emissions exposure in response to the estimated chemical emissions exposure. The total accumulated chemical emissions exposure may thereby be kept within a predetermined limit.

Figure 6:
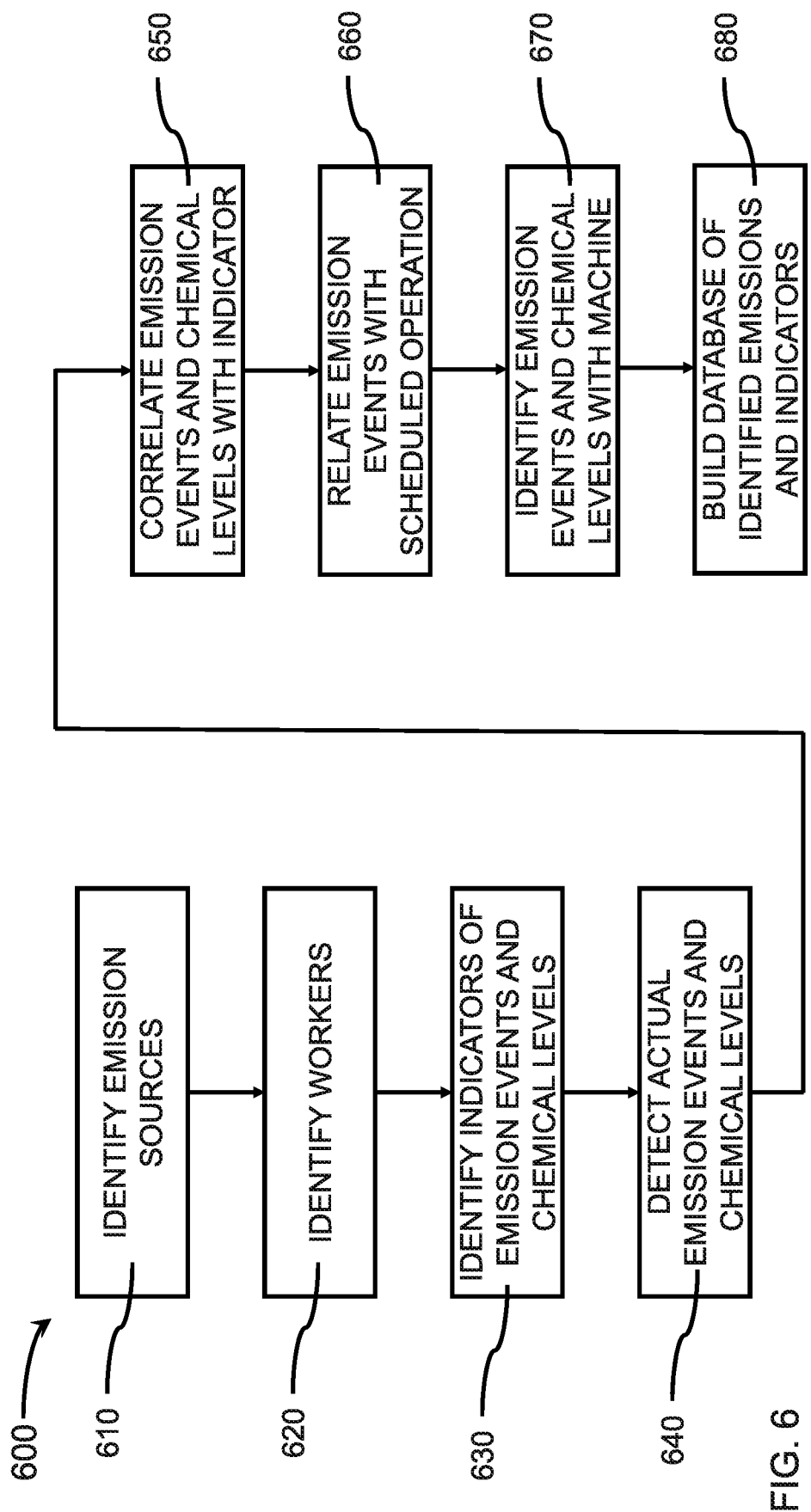
FIG. 6 is a block/flow diagram of a method of training a cognitive WHIP according to an exemplary embodiment.

FIG. 6 is a block/flow diagram of a method 600 of training a cognitive WHIP according to an exemplary embodiment.

The cognitive WHIP may correlate a schedule of activities stored by the cognitive WHIP system with a plurality of indicators to associate the occurrence of an chemical emission event with a particular activity scheduled at the time of the occurrence in reference to a particular indicator.

In block 610, the cognitive WHIP may learn which chemical emissions sources exist in a facility and contribute to the chemical emissions concentration levels, so chemical emissions events may be identified.

In block 620, the cognitive WHIP may learn which workers may be present in the facility and may be exposed to the chemical emission concentration levels.

In block 630, the cognitive WHIP may learn which indicators occur prior to a chemical emissions event or contribute to the chemical emission concentration level.

In block 640, the cognitive WHIP detects actual chemical emissions events and/or chemical emission concentration levels.

In block 650, the cognitive WHIP correlates the chemical emissions event or chemical emission concentration level with the learned indicator, so that the detection of an indicator by the cognitive WHIP can be utilized to predict the occurrence of the chemical emissions event or chemical emission concentration level.

In block 660, the cognitive WHIP identifies the time and date of the indicator and the chemical emissions event or chemical emission concentration level, and identifies operations schedule at the time of the chemical emissions event or chemical emission concentration level in the chemical emissions zone. The indicator may be used as a trigger to learn the inter-relationship between the scheduled operation and the chemical emissions event or chemical emission concentration level.

In block 670, the cognitive WHIP learns which machinery or equipment operating at the time of the chemical emissions event or chemical emission concentration level is the chemical emission source based on the scheduled operation.

In block 680, the cognitive WHIP is trained to identify which indicators correlate with the machinery or equipment operating at the time of the chemical emissions event or chemical emission concentration level is the chemical emission source based on the scheduled operation. By recognizing that a particular indicator foretells the occurrence of a chemical emissions event or chemical emission concentration level when a particular operation is scheduled, the cognitive WHIP system can learn to recognize which indicators, chemical emission events, and scheduled activities are inter-related, and predict what chemical emission concentration levels are expected to occur in a chemical emission zone based on scheduled activities. The information can be compiled in a database as the cognitive WHIP learns new correlations.

The cognitive WHIP may implement ameliorative actions based on the scheduled operations and corresponding chemical emission events or chemical emission concentration levels.

Figure 7:
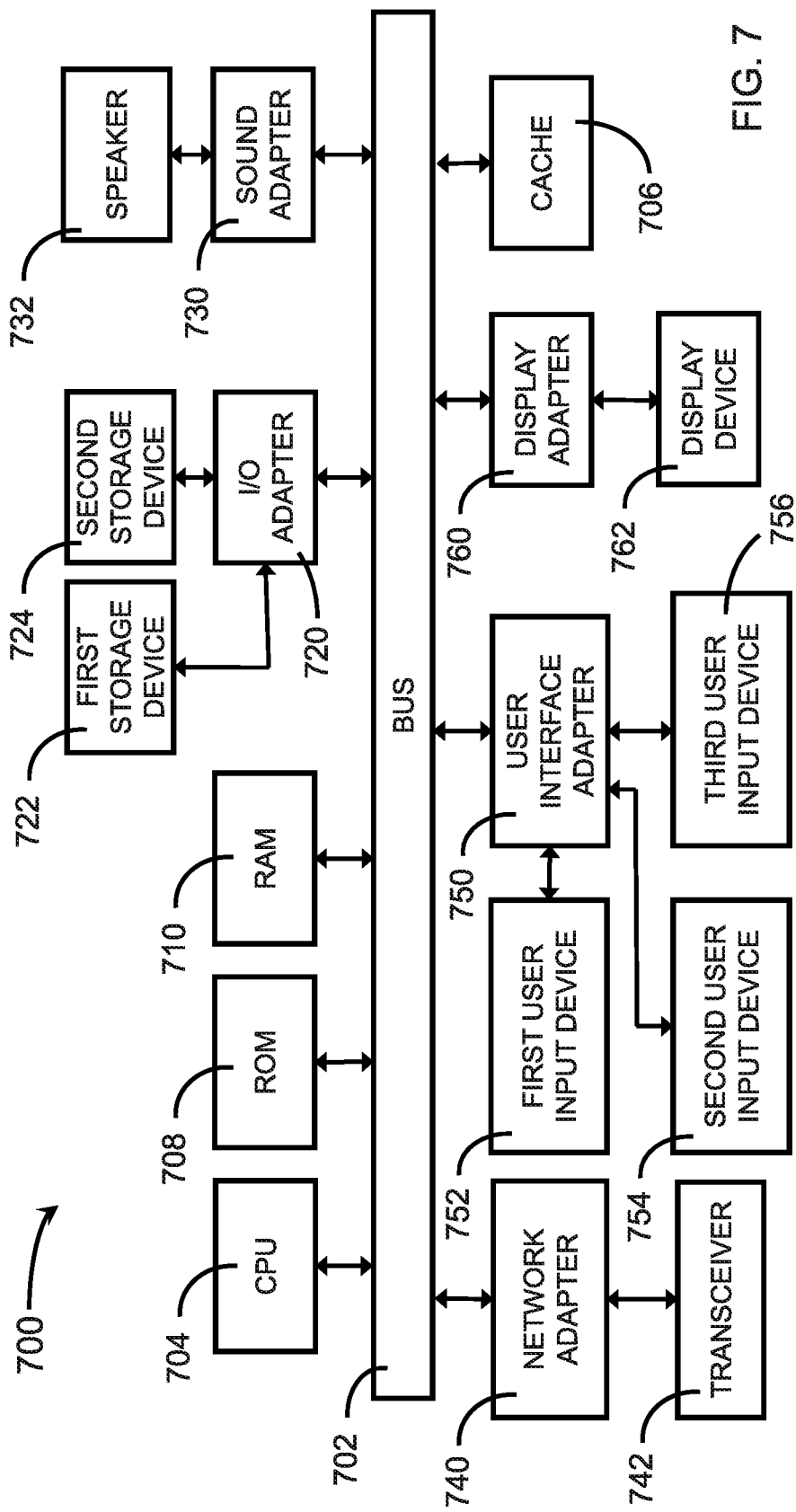
FIG. 7 is an exemplary processing system to which the present principles may be applied in accordance with an embodiment of the present disclosure.

FIG. 7 is an exemplary processing system 700 to which the present principles may be applied in accordance with an embodiment of the present disclosure. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 230. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

Moreover, it is to be appreciated that system 700 is a system for implementing respective embodiments of the present principles. Part or all of processing system 700 may be implemented in one or more of the elements of FIG. 3.

Further, it is to be appreciated that processing system 700 may perform at least part of the method described herein including, for example, at least part of method 200 of FIG. 2, and method 600 of FIG. 6.

Having described preferred embodiments of a system and method for predicting exposure to harmful chemical emission levels by detecting at least some of the one or more indicators (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer implemented method of avoiding harmful chemical emission concentration levels, comprising:
   implementing, on a computer, a cognitive suite of workplace hygiene and injury predictors (WHIP);
   training the cognitive WHIP to identify one or more chemical emission sources and one or more indicators of harmful chemical emission concentration levels before an occurrence, where the indicators are predictive of the occurrence of a harmful chemical emission event;
   predicting the occurrence of a harmful chemical emission event by recognizing an increased likelihood of the occurrence through detecting at least one of the one or more indicators of harmful chemical emission concentration levels by the cognitive WHIP to estimate a chemical emission exposure level of a person exposed to the predicted harmful chemical emission event from the one or more chemical emission sources before the occurrence; and
   implementing a corrective action by altering the operation of a chemical emissions source, modifying a time of a scheduled task, and/or changing prescribed personal protective equipment before the occurrence.

2. The method of claim 1, wherein the cognitive suite of workplace hygiene and injury predictors has learned to identify the one or more chemical emission sources and one or more indicators of harmful chemical emission concentration levels by receiving signals at the computer from one or more sensors, correlating the signals with scheduled operations stored by the cognitive WHIP, and identifying at least one of the one or more indicators corresponding to one or more chemical emission sources operating at the time of the harmful chemical emission concentration levels based on the scheduled operation.

3. The method of claim 1, which further comprises predicting chemical emission exposure levels of a person, tracking cumulative actual chemical emission exposure levels for the person, and pre-emptively adjusting the time of a scheduled task in anticipation of predicted chemical emission exposure levels before the chemical emission exposure levels of the person are above a threshold limit.

4. The method of claim 3, wherein predicting chemical emission exposure levels includes determining the location of the person for one or more assigned tasks, identifying a path used by the person to transit to the location(s), analyzing a chemical emissions map for the location(s), and calculating a predicted amount of cumulative chemical emissions exposure for the person.

5. The method of claim 3, which further comprises monitoring the actual chemical emission exposure levels experienced by the person in a chemical emissions zone.

6. The method of claim 5, which further comprises identifying the location of a person in the chemical emissions zone, and transmitting a control signal to the chemical emissions source to slow down or turn off for a predetermined period of time to reduce the actual chemical emission exposure levels in the chemical emission zone.

7. The method of claim 1, wherein the indicator of harmful chemical emission concentration level is identification by facial recognition, activation of an interlock, detection of an RFID at a portal, or combinations thereof.

8. A chemical emissions protection system, comprising:
   a computer including a central processing unit (CPU) and a memory;
   a cognitive suite of workplace hygiene and injury predictors (WHIP) implemented on the computer, wherein the cognitive suite of workplace hygiene and injury predictors has been trained to identify one or more chemical emissions sources and indicators of harmful chemical emission concentration levels before an occurrence, where the indicators are predictive of the occurrence of a harmful chemical emission event, and to predict the occurrence of a harmful chemical emission event by recognizing an increased likelihood of the occurrence through detecting at least one of the one or more indicators of harmful chemical emission concentration levels to estimate a chemical emission exposure level of a person exposed to the predicted harmful chemical emission event from the one or more chemical emission sources before the occurrence;
   a monitoring interface utilizing the central processing unit (CPU) coupled to one or more sensor(s) for detecting at least one of the one or more indicators of harmful chemical emission concentration levels; and
   a warning system configured to implement a corrective action by altering the operation of a chemical emission source, modifying a time of a scheduled task, and/or changing prescribed personal protective equipment before the occurrence.

9. The system of claim 8, wherein the cognitive suite of workplace hygiene and injury predictors is trained by receiving signals from one or more sensors, correlating the signals with scheduled operations, and identifying indicators of harmful chemical emission concentration levels corresponding to one or more chemical emission sources operating at the time of the harmful chemical emission concentration levels based on the scheduled operation.

10. The system of claim 8, which further comprises a scheduler configured to predict chemical emission exposure levels of a person, track cumulative actual chemical emission exposure levels for the person, and pre-emptively adjust the time of a scheduled task in anticipation of predicted chemical emission exposure levels before the chemical emission exposure levels of the person are above a threshold limit.

11. The system of claim 10, wherein the monitoring interface is configured to determine the location of the person for one or more assigned tasks, identify a path used by the person to transit to the location(s), analyze a chemical emissions map for the location(s), and calculate a predicted amount of cumulative chemical emissions exposure for the person.

12. The system of claim 10, wherein the monitoring interface is configured to monitor the actual chemical emission exposure levels experienced by the person in a chemical emissions zone.

13. The system of claim 12, wherein the monitoring interface is configured to identify the location of a person in the chemical emissions zone, and transmit a control signal to the chemical emissions source to slow down or turn off for a predetermined period of time to reduce the actual chemical emission exposure levels in the chemical emissions zone.

14. The system of claim 8, wherein the indicator of harmful chemical emission concentration level is identification by facial recognition, activation of an interlock, detection of an RFID at a portal, or combinations thereof.

15. A non-transitory computer readable storage medium comprising a computer readable program for predicting exposure to harmful chemical emission concentration levels, wherein the computer readable program when executed on a computer causes the computer to perform the steps of:
  implementing a cognitive suite of workplace hygiene and injury predictors (WHIP);
  training the cognitive WHIP to identify one or more chemical emission sources and one or more indicators of harmful chemical emission concentration levels before an occurrence, where the indicators are predictive of the occurrence of a harmful chemical emission event;
  predicting the occurrence of a harmful chemical emission event by recognizing an increased likelihood of the occurrence through detecting at least one of the one or more indicators of harmful chemical emission concentration levels by the cognitive WHIP to estimate a chemical emission exposure level of a person exposed to the predicted harmful chemical emission event from the one or more chemical emission sources before the occurrence; and
  implementing a corrective action by altering the operation of a chemical emissions source, modifying a time of a scheduled task, and/or changing the prescribed personal protective equipment before the occurrence.

16. The non-transitory computer readable storage medium of claim 15, wherein the computer readable program when executed on a computer causes the computer to: learn to identify chemical emission sources and indicators of harmful chemical emission concentration levels by receiving signals from one or more sensors, correlating the signals with scheduled operations, and identifying indicators of harmful chemical emission concentration levels corresponding to one or more chemical emission sources operating at the time of the harmful chemical emission concentration levels based on the scheduled operation.

17. The non-transitory computer readable storage medium of claim 15, wherein the computer readable program when executed on a computer causes the computer to: predict chemical emission exposure levels of a person, track cumulative actual chemical emission exposure levels for the person, and pre-emptively adjust the time of a scheduled task in anticipation of predicted chemical emission exposure levels before the chemical emission exposure levels of the person are above a threshold limit.

18. The non-transitory computer readable storage medium of claim 17, wherein the computer readable program when executed on a computer causes the computer to: predict chemical emission exposure levels by determining the location of the person for one or more assigned tasks, identifying a path used by the person to transit to the location(s), analyzing a chemical emissions map for the location(s), and calculating a predicted amount of cumulative chemical emissions exposure for the person.

19. The non-transitory computer readable storage medium of claim 17, wherein the computer readable program when executed on a computer causes the computer to: monitor the actual chemical emission exposure levels experienced by the person in a chemical emissions zone.

20. The non-transitory computer readable storage medium of claim 19, wherein the computer readable program when executed on a computer causes the computer to: identify the location of a person in the chemical emissions zone, and transmit a control signal to the chemical emissions source to slow down or turn off for a predetermined period of time to reduce the actual chemical emission exposure levels in the chemical emissions zone.

\* \* \* \* \*